US008868645B1

(12) United States Patent
Leong

(10) Patent No.: US 8,868,645 B1
(45) Date of Patent: Oct. 21, 2014

(54) METHOD AND SYSTEM FOR PRIORITIZING COMMERCIAL COMMUNICATIONS PROCESSING BASED ON LOCATION DATA

(75) Inventor: Bruce F. Leong, Saratoga, CA (US)

(73) Assignee: Intuit Inc., Mountain View, CA (US)

( * ) Notice: Subject to any disclaimer, the term of this patent is extended or adjusted under 35 U.S.C. 154(b) by 861 days.

(21) Appl. No.: 13/010,606

(22) Filed: Jan. 20, 2011

(51) Int. Cl.
*G06F 15/16* (2006.01)
*H04L 12/58* (2006.01)
*G06Q 10/06* (2012.01)
*G06F 17/30* (2006.01)

(52) U.S. Cl.
CPC .............. *H04L 51/26* (2013.01); *G06Q 10/063* (2013.01); *G06F 17/3053* (2013.01)
USPC .......................................... 709/203; 709/207

(58) Field of Classification Search
CPC ... G06F 17/3053; G06Q 10/063; H04L 51/26
USPC ................................................. 709/203, 207
See application file for complete search history.

(56) References Cited

U.S. PATENT DOCUMENTS

| | | | | |
|---|---|---|---|---|
| 7,831,268 | B2* | 11/2010 | Daigle | 455/512 |
| 8,320,876 | B2* | 11/2012 | Shaffer et al. | 455/404.1 |
| 8,509,832 | B1* | 8/2013 | Daigle | 455/512 |
| 8,577,007 | B2* | 11/2013 | Sherman et al. | 379/210.01 |
| 2007/0100674 | A1* | 5/2007 | Fisher et al. | 705/7 |
| 2008/0037763 | A1* | 2/2008 | Shaffer et al. | 379/266.01 |
| 2008/0056269 | A1* | 3/2008 | Madhani et al. | 370/395.2 |
| 2009/0041221 | A1* | 2/2009 | Sherman et al. | 379/210.01 |
| 2012/0039451 | A1* | 2/2012 | Shaffer et al. | 379/142.1 |

* cited by examiner

*Primary Examiner* — Larry Donaghue
(74) *Attorney, Agent, or Firm* — Hawley Troxell Ennis & Hawley LLP; Philip McKay

(57) ABSTRACT

A method and system for prioritizing commercial communications based on location data whereby a merchant is identified and a priority communication source location database is created for, and/or associated with, the merchant. Then when a communication from a source party is received from a source party communication system the source location of the source party communication system, and/or the source party, is determined from location data. The location data representing the determined source location of the source party communication system, and/or the source party, is then used to search the priority communication source location database and if the source location of the source party communication system matches data indicating priority source locations in the priority communication source location database, if so, the communication is processed on a priority basis.

19 Claims, 2 Drawing Sheets

METHOD AND SYSTEM FOR PRIORITIZING COMMERCIAL COMMUNICATIONS PROCESSING BASED ON LOCATION DATA

BACKGROUND

As the volume of communications and information has exponentially increased over the past two decades, it has become increasing difficult to identify priority communications from less urgent communications, and in some cases from unwanted communications, and then process the priority communications in accordance with their priority status.

Merchants, such as business owners, and/or providers of products and services, are often particularly interested in identifying priority communications from potential customers, or significant clients.

As one example, a merchant who provides services may need to process communications from some of the merchant's clients, i.e., "priority clients", or customers of the merchant's priority clients, on a priority or expedited basis. Consequently, the merchant would find it very helpful to identify communications from the merchant's priority clients, or customers of the merchant's priority clients, in order to efficiently use processing resources.

For instance, credit approval services are often contractually obligated to process credit applications from potential customers of their larger, "priority clients" in defined timeframes, such as within minutes or hours. However, currently, when a customer of a priority client calls in, electronically submits, or otherwise attempts to contact, the credit approval service, the credit approval service typically has no idea if the customer, i.e., the source party of the communication, is a customer of a priority client or a customer of some other client. Consequently, in this situation, the credit approval service must either employ sufficient resources, such as processing agents, to process all communications as if they were from a customer of the priority client, i.e., so that all credit applications from all sources are processed within the timeframe of the contract with the priority clients, or risk failing to meet their contractual obligation with the priority clients. Clearly, processing all communications as if they were from a customer of a priority client is an inefficient use of resources; however, failing to meet contractual obligations with priority clients is equally unattractive.

As another example, a merchant who provides products or services may want to process communications from customers, or potential customers, who meet one or more priority criteria indicating the communications from these "priority customers" need to be processed as soon as possible to avoid losing their business.

For instance, a car dealer may consider a customer who is currently at a competitor car dealer's location to be a "priority customer". In this instance, the car dealer may well want to process any communications from this priority customer, such as a credit pre-approval application, or even a simple phone call, as quickly as possible and at a higher priority than communications from other potential customers. However, currently, when this type of priority customer calls from a mobile phone, or otherwise attempts to contact the car dealer, using a communication system associated with the priority customer, as opposed to the competing car dealer, the car dealer typically has no idea if the communication is from a priority customer or some other customer or party. Consequently, in this situation, the car dealer must choose between staffing at levels that allow each communication to be treated as a priority communication or risk losing priority customers to a competitor. Again this is a lose-lose choice for the merchant.

As another example, a merchant who provides products or services may want to process communications from customers, or potential customers, who meet one or more proximity priority criteria indicating the communications from these "priority customers" need to be processed as soon as possible to avoid losing their business.

For instance, a merchant who provides local services, such as a dry cleaner or food service merchant, may consider a customer who is currently in the area to be a "priority customer". In this instance, the merchant may well want to process any communication from a priority customer within a certain distance of the merchant's business, such as within the same mall or shopping center as the merchant's business, as quickly as possible and at a higher priority than communications from other potential customers. However, currently, when this type of priority customer calls in, or otherwise attempts to contact the merchant, using a mobile communication system for instance, the merchant typically has no idea if the communication is from a priority customer or some other customer or party. Consequently, in this situation, the merchant must also choose between staffing at levels that allow each communication to be treated as a priority communication or risk losing some priority customers. Again this is a lose-lose choice for the merchant.

As a result of the situation discussed above, merchants are currently often forced to choose between two undesirable options, committing the resources to allow each communication to be treated as a priority communication, or risk losing priority customers and/or clients. Clearly this is a far from ideal situation for both the merchants and their customers.

SUMMARY

In accordance with one embodiment, a method and system for prioritizing commercial communications based on location data includes a process for prioritizing commercial communications based on location data whereby, in one embodiment, a merchant is identified and/or signed up to take part in the process for prioritizing commercial communications based on location data. In one embodiment, a priority communication source location database is created for, and/or associated with, the merchant that includes data indicating priority source locations associated with the merchant that, when associated with a communication from a source party, indicate that the communication from the source party is a priority communication for the merchant. In one embodiment, a communication from a source party is then received from a source party using a source party communication system. In one embodiment, the source location of the source party communication system, and/or the source party, is determined from location data, such as GPS, IP addresses, text fields, phone numbers, caller ID, or other location and/or positional data, provided by, and/or received from, the source party communication system, and/or the source party. In one embodiment, data representing the determined source location of the source party communication system, and/or the source party, is used to search the priority communication source location database created for, and/or associated with, the merchant. In one embodiment, if the data representing the determined source location of the source party communication system, and/or the source party, matches data indicating priority source locations in the priority communication source location database created for, and/or associated with, the merchant, then the status of the communication from the source party is transformed to a status of priority communication and is processed by, and/or for, the merchant on a priority basis.

Using the method and system for prioritizing commercial communications based on location data discussed herein, a merchant is provided the ability to prioritize the processing of communications based on the locations of the source party, and/or source party communication systems used to initiate the communications and, in some embodiments, using location data provided by the source party communication systems themselves. Consequently using the method and system for prioritizing commercial communications based on location data discussed herein, a merchant can identify priority communications, and prioritize the processing of the identified priority communications, more readily; thereby avoiding the need to choose between the two undesirable options of committing the resources to allow each communication to be treated as a priority communication or risking the loss of priority customers and/or clients that is necessitated using currently available methods and systems.

As discussed in more detail below, using the below embodiments, with little or no modification and/or user input, there is considerable flexibility, adaptability, and opportunity for customization to meet the specific needs of various users under numerous circumstances.

Figure 1:
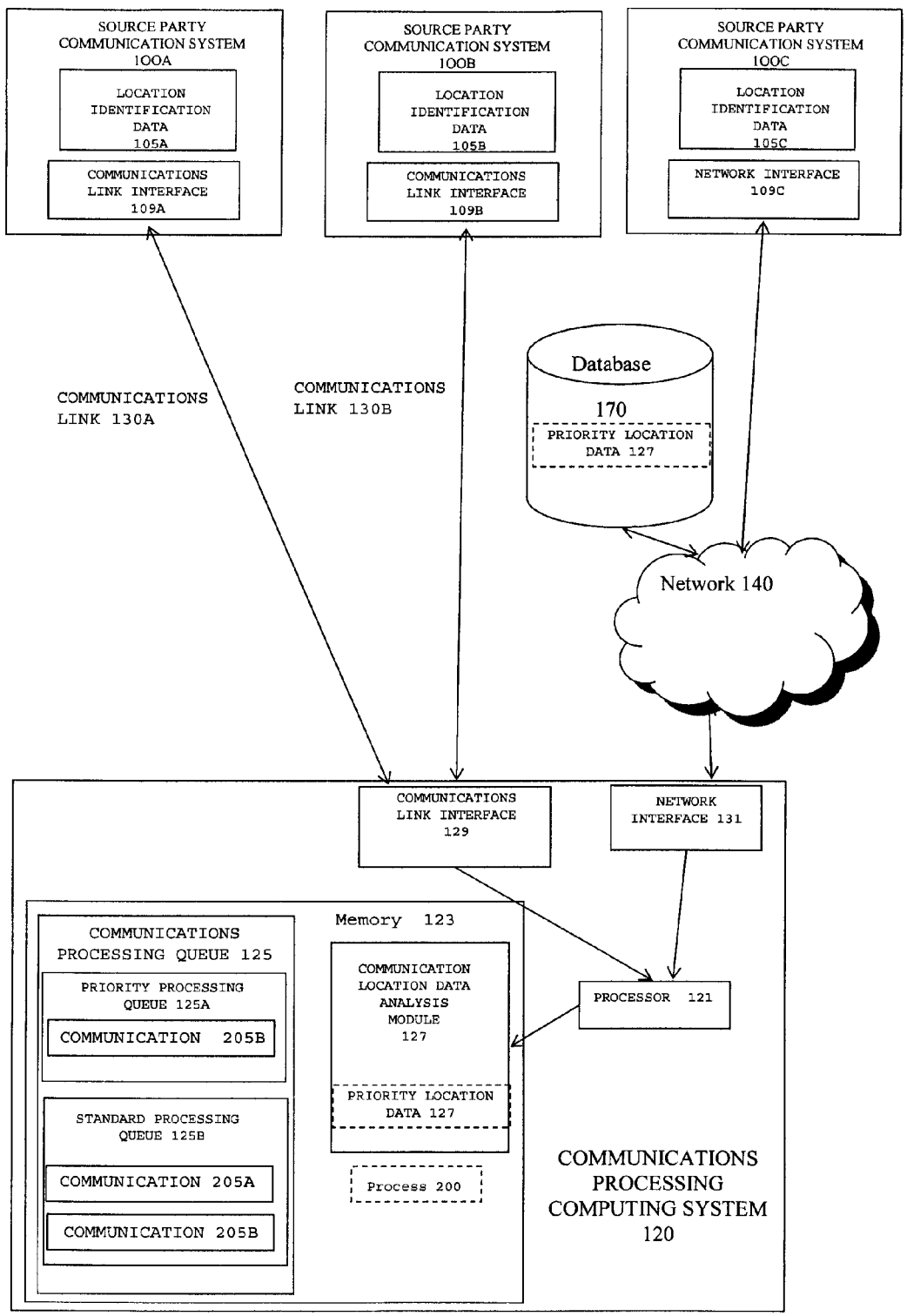
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a process for prioritizing commercial communications based on location data begins when a merchant is identified and/or signed up to take part in the process for prioritizing commercial communications based on location data.

In one embodiment, the merchant, such as a business owner and/or a provider of products and services, signs up directly to take part in the process for prioritizing commercial communications based on location data. In other embodiments, the merchant, such as a business owner, and/or a provider of products and services, is identified, and/or signed up, by a third party associated with the merchant, such as a provider of services and/or products to the merchant and for whom the merchant is a client and/or customer.

In various embodiments, the merchant is identified and/or signed up to take part in the process for prioritizing commercial communications based on location data through one or more computing systems and/or using one or more processors associated with the one or more computing systems.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, a priority communication source location database is created for, and/or associated with, the merchant that includes data indicating priority source locations associated with the merchant that, when associated with a communication from a source party, indicate that the communication from the source party is a priority communication for the merchant.

As used herein, the term "database" includes any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

In various embodiments, the priority source locations associated with the merchant are, or are determined based on, one or more of, but not limited to, the following criteria: a location, and/or locations, of the merchant and/or the merchant's store or stores; a location, and/or locations, that include the merchant and/or the merchant's store or stores, such as malls or shopping centers; a location, and/or locations, of the merchant's competitors, and/or the merchant's competitor's store or stores; a location, and/or locations, that include the merchant's competitor's and/or the merchant's competitor's store or stores, such as malls or shopping centers; a location, and/or locations, of related merchants selling products and/or services related to the merchant's business and the related merchant's store or stores; a location, and/or locations, that include related merchants selling products and/or services related to the merchant's business and the related merchant's store or stores, such as malls or shopping centers; and/or any other location designated as a priority source location associated with the merchant by any party.

In one embodiment, the priority source locations associated with the merchant are provided by the merchant and/or a third party, such as a third party for whom the merchant is a client and/or customer.

In one embodiment, the priority source locations associated with the merchant are determined by the process for prioritizing commercial communications based on location data, and/or any other party, and based on analysis of data provided by the merchant and/or a third party, such as a third party for whom the merchant is a client and/or customer.

In one embodiment, the priority source locations associated with the merchant are determined by the process for prioritizing commercial communications based on location data, and/or any other party, and based on analysis of the merchant's business and/or the name of the merchant and/or the location of the merchant.

In various embodiments, the priority source locations associated with the merchant are determined by any means, method, process, and/or procedure and/or combination of means, methods, processes, and/or procedures, as discussed herein, and/or as known in the art at the time of filing, and/or as developed after the time of filing.

In one embodiment, a communication from a source party is received from a source party using a source party communication system.

In various embodiments, the source party communication system can be, but is not limited to: a mobile phone; a landline phone, a VOIP phone, a smart phone; an SMS capable system; any mobile computing system; any other computing system and/or computing system implemented process or application; and/or any device that generates, provides, and/or includes, location and/or position data associated with the source party communication system and that indicates a current location or position of the source party communication system and/or the source party.

In one embodiment, the source location of the source party communication system, and/or the source party, is determined from location and/or positional data provided by, and/or received from, the source party communication system, and/or the source party.

Some currently available location and/or positional data can include, but is not limited to: GPS data; IP addresses; caller ID data; a phone number; an area code; data provided through a computing system, and/or a process and/or application implemented on a computing system; text data; and/or any other means, method, process, and/or procedure and/or combination of means, methods, processes, and/or procedures, for providing location and/or positional data as discussed herein, and/or as known in the art at the time of filing, and/or as developed after the time of filing.

In one embodiment, data representing the determined source location of the source party communication system, and/or the source party, is used to search the priority communication source location database created for, and/or associated with, the merchant.

In one embodiment, data representing the determined source location of the source party communication system, and/or the source party, is used to search the priority communication source location database created for, and/or associated with, the merchant under the direction of one or more processors associated with one or more computing systems.

In one embodiment, if the data representing the determined source location of the source party communication system, and/or the source party, matches, or matches within a defined tolerance, data indicating priority source locations in the priority communication source location database created for, and/or associated with, the merchant, then the status of the communication from the source party is transformed to a status of priority communication and is processed by, and/or for, the merchant on a priority basis.

In one embodiment, the data representing the determined source location of the source party communication system, and/or the source party, is considered to match the data indicating priority source locations in the priority communication source location database created for, and/or associated with, the merchant, if the source location of the source party communication system is determined to be within a defined tolerance, such as a defined radius, or other distance, of one or more of the priority source locations.

In various embodiments, the defined tolerance is determined by the process for prioritizing commercial communications, and/or a provider of the process for prioritizing commercial communications, and/or the merchant, and/or a third party to whom the merchant is a client and/or customer, and/or any other party.

In one embodiment, the analysis to determine if the data representing the determined source location of the source party communication system, and/or the source party, matches, or matches within a defined tolerance, data indicating priority source locations in the priority communication source location database created for, and/or associated with, the merchant, is performed by one or more processors associated with one or more computing systems.

In one embodiment, the status of the communication from the source party is transformed to a status of priority communication by one or more processors associated with one or more computing systems.

In one embodiment, the identified priority communication is then processed on a priority basis by the merchant.

In one embodiment, the identified priority communication is then processed on a priority basis by a third party on behalf of the merchant.

As one illustrative example of the use of one embodiment of the process for prioritizing commercial communications based on location data discussed herein, a user who provides services and needs to process communications from some of the user's clients, i.e., "priority clients", or customers of the user's priority clients, on a priority or expedited basis, would use the process for prioritizing commercial communications based on location data discussed herein to identify communications originating from, or from the vicinity of, stores associated with the priority client and/or selling the priority client's products and/or services. The user would then prioritize processing these communications accordingly.

As an even more specific example, assume a user who is a credit approval service provider is contractually obligated to process credit applications from potential customers of their largest, "priority client" in a defined timeframe, such as within 15 minutes.

Using the process for prioritizing commercial communications based on location data discussed herein, a priority communication source location database would be created for, and/or associated with, the priority client of the user credit approval service provider and/or any sellers of the products and/or services associated with the priority client, that includes data indicating priority source locations associated with the priority client and/or any sellers of the products and/or services associated with the priority client.

In this specific example, when a credit application, and/or credit application communication, is received by the user credit approval service provider, the location of the customer/submitter of the credit application, and/or credit application communication, i.e., the source location of the source party and/or the source party communication system, is determined by obtaining location information from any of: text data submitted in an electronically submitted credit application form, and/or credit application form communication; a mobile computing system or phone used to submit, or make, the credit application, and/or credit application communication;

and/or a store's computing system or phone used to submit, or make, the credit application, and/or credit application communication.

In this specific illustrative example, data indicating the source location of the source party and/or the source party communication system, i.e., the source location of the credit application, and/or credit application communication, is compared with the priority source location data in the priority communication source location database created for, and/or associated with, the priority client of the user credit approval service provider. In this specific illustrative example, if it is found that the source location of the credit application, and/or credit application communication, is, or is in the vicinity of, one of the priority source locations for, and/or associated with, the priority client of the credit approval service provider, i.e., the priority client location, or the location of stores associated with the priority client and/or selling the priority client's products and/or services, then the status of the credit application, and/or credit application communication, would be transformed to a status of priority communication and the credit application, and/or credit application communication, would be moved into a priority queue and processed on a priority basis by the user credit approval service.

As another illustrative example of the use of one embodiment of the process for prioritizing commercial communications based on location data discussed herein, a user who provides products and/or services and wants to process communications from customers, or potential customers, who meet one or more priority criteria would use the process for prioritizing commercial communications based on location data discussed herein to identify communications from these priority customers based on their location data.

As an even more specific example, assume a user is a car dealer and this car dealer desires to process communications, such as phone calls or credit preapproval applications, from competitors locations, or nearby locations, on a priority basis.

Using the process for prioritizing commercial communications based on location data discussed herein, a priority communication source location database would be created for, and/or associated with, the car dealer and would include data indicating priority source locations associated with the car dealer's competitors and/or other locations near the car dealer or the competitors of the car dealer.

In this specific example, when a communication, such as a phone call from a mobile phone or computing system, is received by the car dealer's communications system, the location of the caller's mobile phone or computing system, and/or the caller, i.e., the source location of the source party and/or the source party communication system, could be determined by obtaining location information from the mobile phone or computing system used to initiate the communication, i.e., to make the call. In this example, assume the mobile phone or computing system has a GPS, caller ID, or other caller location function.

In this specific illustrative example, data indicating the source location of the source party and/or the source party communication system, i.e., the location of the caller and/or the mobile phone or computing system, is compared with the priority source location data in the priority communication source location database created for, and/or associated with, the car dealer. In this specific illustrative example, if it is found that the source location of mobile phone or computing system, is, or is in the vicinity of, the priority source locations for, and/or associated with, the competitors of the car dealer, and/or the specified nearby locations, then the status of the phone call, or other communication, would be transformed to a status of priority communication and the phone call, or other communication, would be processed on a priority basis by the car dealer, e.g., the phone call would be moved into a priority queue and taken by a salesperson as soon as possible.

As another illustrative example of the use of one embodiment of the process for prioritizing commercial communications based on location data discussed herein, a user who provides products and/or services and wants to process communications from customers, or potential customers, who meet one or more proximity priority criteria would use the process for prioritizing commercial communications based on location data discussed herein to identify communications from these priority customers based on their location data.

As an even more specific example, assume a user is a dry cleaner who gets over 90% of his business from local residents and the dry cleaner desires to process communications, such as phone calls and/or e-mails, from locations within defined area surrounding the dry cleaner's business on a priority basis.

Using the process for prioritizing commercial communications based on location data discussed herein, a priority communication source location database would be created for, and/or associated with, the dry cleaner and would include data indicating priority source locations and other data, such as phone number sequences, associated with the dry cleaner's location and the area of interest.

In this specific example, when a communication, such as a phone call, is received by the dry cleaner's communications system, the location of the caller's phone or computing system, and/or the caller, i.e., the source location of the source party and/or the source party communication system, could be determined by obtaining location information from the phone or computing system used to initiate the communication, i.e., to make the call. In this example, assume the phone or computing system has a GPS, caller ID, or some other caller location function.

In this specific illustrative example, data indicating the source location of the source party and/or the source party communication system, i.e., the location of the caller and/or the phone or computing system, is compared with the priority source location data in the priority communication source location database created for, and/or associated with, the dry cleaner. In this specific illustrative example, if it is found that the source location of the phone or computing system, is, or is in the vicinity of, the priority source locations for, and/or associated with, the dry cleaner, and/or the area specified, then the status of the phone call, or other communication, would be transformed to a status of priority communication and the phone call, or other communication, would be processed on a priority basis by the dry cleaner, e.g., the phone call would be moved into a priority queue and taken as soon as possible.

Those of skill in the art will readily recognize that the three specific examples discussed above are presented for illustrative purposes only and that numerous other examples, embodiments, uses, and implementations are possible. Consequently, the three specific examples discussed above do not, in any way, limit the scope of the claims presented below.

Using the process for prioritizing commercial communications based on location data discussed herein, a merchant is provided the ability to prioritize the processing of communications based on the locations of the source party communication systems used to initiate the communications and using location data provided by the source party communication systems themselves. Consequently using the process for prioritizing commercial communications based on location data discussed herein, a merchant can identify priority communications, and prioritize the processing of the identified priority communications, more readily; thereby avoiding the need to choose between the two undesirable options of committing the resources to allow each communication to be treated as a priority communication or risking the loss of priority customers and/or clients that is necessitated using currently available methods and systems.

Hardware System Architecture

FIG. 1 is a block diagram of an exemplary hardware architecture for implementing one embodiment of a system and method for prioritizing commercial communications based on location data, such as exemplary process 200, discussed herein, that includes: source party communication systems 100A, 100B, 100C, e.g., two or more communication systems; a database 170; a communications processing computing system 120, e.g., a provider computing system; communications link 130A; communications link 130B; and a network 140.

As seen in FIG. 1, source party communication systems 100A, 100B, 100C typically include location and/or positional data 105A, 105B, and 105C, and communications link interfaces 109A, 109B, and/or network interface 109C.

Although, as an illustrative example, three source party communication systems 100A, 100B, 100C are shown in FIG. 1, the number of source party communication systems 100A, 100B, 100C can be any number "N", greater, or less than the three systems shown.

In one embodiment, any, or all, of source party communication systems 100A, 100B, 100C can be, but are not limited to: a mobile phone; a land-line phone, a VOIP phone, a smart phone; an SMS capable system; any mobile computing system; any other computing system and/or computing system implemented process or application; and/or any device that generates, provides, and/or includes, location and/or position data, such as location and/or positional data 105A, 105B, and 105C, associated with the source party communication system and that indicates a current location or position of the source party communication system and/or the source party.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, location and/or positional data 105A, 105B, and 105C, can include, but is not limited to: GPS data; IP addresses; caller ID data, alphanumeric text; phone numbers; and/or any other location and/or positional data as discussed herein, and/or as known in the art at the time of filing, and/or as developed after the time of filing.

In various embodiments, communications link 130A and communications link 130B can be, but are not limited to: mobile communications links; "land-line" communications links; cable-based communications links; satellite based communications links; SMS communications links; network, or Internet communication links; and/or any other communication links as discussed herein, and/or as known in the art at the time of filing, and/or as developed after the time of filing.

Also shown in FIG. 1 is database 170. In various embodiments, database 170 is any data storage mechanism known at the time of filing or as developed thereafter, such as, but not limited to: a computing system, such as communications processing computing system 120; a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

In one embodiment, database 170 is a priority communication source location database and includes priority location data 127 that includes data indicating priority source locations associated with one or more merchants that, when associated with a communication from a source party, indicates that the communication from the source party is a priority communication for the one or more merchants. As discussed below, and shown in FIG. 1, all, or part of, priority location data 127 can also be stored in communications processing computing system 120.

In one embodiment, source party communication systems 100A, 100B, are coupled to a communications processing computing system 120 through communications link 130A and communications link 130B. In one embodiment, source party communication system is coupled to communications processing computing system 120 through network 140.

Although, as an illustrative example, a single communications processing computing system 120 is shown in FIG. 1, the number of communications processing computing systems 120 can be any number "N" greater than the single system shown. In one embodiment, communications processing computing system 120 typically includes a processor 121, a network interface 131, a communications link interface 129 and a memory 123. In one embodiment, memory 123 includes all, or part, of process for prioritizing commercial communications based on location data 200.

In one embodiment, memory 123 includes priority location data 127 that includes data indicating priority source locations associated with one or more merchants that, when associated with a communication from a source party, indicates that the communication from the source party is a priority communication for the one or more merchants. As discussed above, and shown in FIG. 1, all, or part of, priority location data 127 can also be stored in database 170 and/or any priority communication source location database.

In one embodiment, memory 123 also includes all, or part of, communication location data analysis module 127 that includes data and/or instruction for analyzing and/or comparing location and/or positional data 105A, 105B, and 105C of source party communication systems 100A, 100B, and 100C and, or with, priority location data 127 to determine if location and/or positional data 105A, 105B, and 105C of source party communication systems 100A, 100B, and 100C matches, or matches within a defined tolerance, priority location data 127, as discussed below.

In one embodiment, memory 123 includes communications processing queue 125 that designates the order that communications from source party communication systems 100A, 100B, and 1000 are processed.

In one embodiment, communications processing queue 125 includes priority processing queue 125A for communications, such as in this example, communication 205B from source party communication system 100B, whose status has been transformed to a status of priority communication based on the analysis of analysis module 127.

In one embodiment, communications processing queue 125 includes standard processing queue 125B for communications, such as in this example, communications 205A and 205B from source party communication systems 100A and 100C, respectively, whose status has been not transformed to a status of priority communication based on the analysis of analysis module 127.

In one embodiment, communications processing computing system 120 is an electronic switchboard under the control of a merchant and/or a third party.

In one embodiment, communications processing computing system 120 is a web-page server.

In one embodiment, communications processing computing system 120 is an application server.

In one embodiment, communications processing computing system 120 is used in a station-to-station arrangement, such as a peer-to-peer, or hybrid peer-to peer, arrangement, as an indexing and/or central server used to connect a first computing system, with other systems, such as source party communication systems 100A, 100B, 100C.

In one embodiment, communications processing computing system 120 is any computing system discussed herein, and/or as known in the art at the time of filing, and/or as developed after the time of filing, such as, but not limited to, a desktop computing system, a laptop computing system, a notebook computing system, a workstation, a two-way pager, a cellular telephone, a smart phone, a digital wireless telephone, a Personal Digital Assistant (PDA), a server computer, an Internet appliance, any other device, or any desired combination of these devices, that includes components that can execute, and/or provide, all, or part, of a process for prioritizing commercial communications based on location data, and/or an online data management system, in accordance with at least one of the embodiments as described herein.

Network 140 can be any network or network system that is of interest to a consumer such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

In one embodiment, any, or all, of source party communication systems 100A, 100B, 100C, and communications processing computing system 120, database 170, and network 140 are part of a cloud computing environment.

Those of skill in the art will readily recognize that the components shown in FIG. 1, such as source party communication systems 100A, 100B, and 100O, and communications processing computing system 120, and their respective components, are shown for illustrative purposes only and that architectures with more or fewer components can implement, and benefit from, the invention. Moreover, one or more components of source party communication systems 100A, 100B, 100C, database 170, and communications processing computing system 120, may be located remotely from their respective system and accessed via network, as discussed herein. In addition, the particular type of, and configuration of, source party communication systems 100A, 100B, and 100C, and communications processing computing system 120 are not relevant.

A process for prioritizing commercial communications based on location data, such as process for prioritizing commercial communications based on location data 200, is sometimes referred to herein, alternatively, as a process, an application, a module, a program, a component of a software system, a component of a software package, a component of a parent system, a plug-in, or a feature of a parent system, however, this terminology is illustrative only. In some embodiments, a process for prioritizing commercial communications based on location data, such as process for prioritizing commercial communications based on location data 200, is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processor 121. In one embodiment, execution of a process by processor 121, results in the operations of an agent computer process (not shown) and/or a rule computer process (not shown).

In one embodiment, a process for prioritizing commercial communications based on location data, such as process for prioritizing commercial communications based on location data 200, and/or various other data discussed herein, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as communications processing computing system 120 of FIG. 1, and signals transmitted over a network, such as network 140 of FIG. 1, or other media or process capable of delivering computer readable data representing computer readable code, whether available or known at the time of filing or as later developed.

Process

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "network" includes any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

In accordance with one embodiment, using a process for prioritizing commercial communications based on location data a merchant is identified and/or signed up to take part in the process for prioritizing commercial communications based on location data. In one embodiment, a priority communication source location database is created for, and/or associated with, the merchant that includes data indicating priority source locations associated with the merchant that, when associated with a communication from a source party, indicate that the communication from the source party is a priority communication for the merchant. In one embodiment, a communication from a source party is then received from a source party using a source party communication system. In one embodiment, the source location of the source party communication system, and/or the source party, is determined from location data, such as GPS, IP addresses, text fields, phone numbers, caller ID, or other location and/or positional data, provided by, and/or received from, the source party communication system, and/or the source party. In one embodiment, data representing the determined source location of the source party communication system, and/or the source party, is used to search the priority communication source location database created for, and/or associated with, the merchant. In one embodiment, if the data representing the determined source location of the source party communication system, and/or the source party, matches data indicating priority source locations in the priority communication source location database created for, and/or associated with, the merchant, then the status of the communication from the source party is transformed to a status of priority communication and is processed by, and/or for, the merchant on a priority basis.

Figure 2:
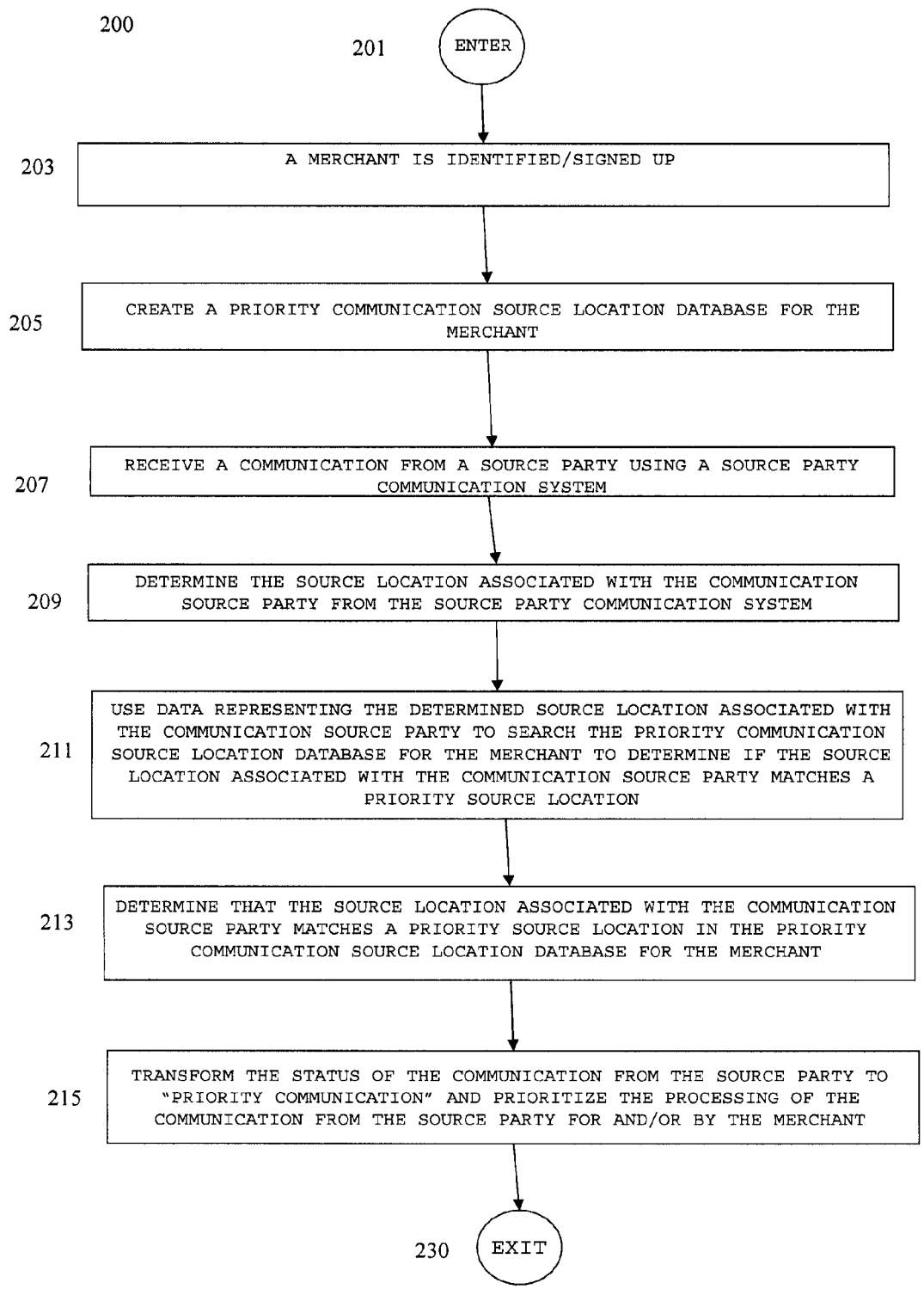
FIG. 2 is a flow chart depicting a process for prioritizing commercial communications based on location data in accordance with one embodiment.

FIG. 2 a flow chart depicting a process for prioritizing commercial communications based on location data 200 in accordance with one embodiment. Process for prioritizing commercial communications based on location data 200 begins at ENTER OPERATION 201 of FIG. 2 and process flow proceeds to A MERCHANT IS IDENTIFIED/SIGNED UP OPERATION 203.

In one embodiment, at A MERCHANT IS IDENTIFIED/SIGNED UP OPERATION 203 a merchant is identified and/or signed up to take part in process for prioritizing commercial communications based on location data 200.

In one embodiment, at A MERCHANT IS IDENTIFIED/SIGNED UP OPERATION 203 the merchant, such as a business owner and/or a provider of products and services, signs up directly to take part in process for prioritizing commercial communications based on location data 200.

In one embodiment, at A MERCHANT IS IDENTIFIED/SIGNED UP OPERATION 203 the merchant, such as a business owner, and/or a provider of products and services, is identified, and/or signed up for process for prioritizing commercial communications based on location data 200 by a third party associated with the merchant, such as a provider of services and/or products to the merchant and for whom the merchant is a client and/or customer.

In various embodiments, at A MERCHANT IS IDENTIFIED/SIGNED UP OPERATION 203 the merchant is identified and/or signed up to take part in process for prioritizing commercial communications based on location data 200 through one or more computing systems, such as communications processing computing system 120 of FIG. 1, and/or using one or more processors, such as processor 121 of FIG. 1, associated with the one or more computing systems, such as communications processing computing system 120 of FIG. 1.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Returning to FIG. 2, in one embodiment, once a merchant is identified and/or signed up to take part in process for prioritizing commercial communications based on location data 200 at A MERCHANT IS IDENTIFIED/SIGNED UP OPERATION 203 process flow proceeds to CREATE A PRIORITY COMMUNICATION SOURCE LOCATION DATABASE FOR THE MERCHANT OPERATION 205.

In one embodiment, at CREATE A PRIORITY COMMUNICATION SOURCE LOCATION DATABASE FOR THE MERCHANT OPERATION 205 a priority communication source location database is created for, and/or associated with, the merchant of A MERCHANT IS IDENTIFIED/SIGNED UP OPERATION 203 that includes data indicating priority source locations associated with the merchant that, when associated with a communication from a source party, indicate that the communication from the source party is a priority communication for the merchant.

In one embodiment, at CREATE A PRIORITY COMMUNICATION SOURCE LOCATION DATABASE FOR THE MERCHANT OPERATION 205 a priority communication source location database, such as database 170 of FIG. 1 and/or part of memory 123 and communications processing computing system 120 including priority location data 127, is created for, and/or associated with, the merchant that includes data, such as priority location data 127, indicating priority source locations associated with the merchant that, when associated with a communication from a source party, indicate that the communication from the source party is a priority communication for the merchant.

As used herein, the term "database" includes any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

Returning to FIG. 2, in various embodiments, the priority source locations associated with the merchant of CREATE A PRIORITY COMMUNICATION SOURCE LOCATION DATABASE FOR THE MERCHANT OPERATION 205 are, or are determined based on, one or more of, but not limited to, the following criteria: a location, and/or locations, of the merchant and/or the merchant's store or stores; a location, and/or locations, that include the merchant and/or the merchant's store or stores, such as malls or shopping centers; a location, and/or locations, of the merchant's competitors, and/or the merchant's competitor's store or stores; a location, and/or locations, that include the merchant's competitor's and/or the merchant's competitor's store or stores, such as malls or shopping centers; a location, and/or locations, of related merchants selling products and/or services related to the merchant's business and the related merchant's store or stores; a location, and/or locations, that include related merchants selling products and/or services related to the merchant's business and the related merchant's store or stores, such as malls or shopping centers; and/or any other location designated as a priority source location associated with the merchant by any party.

In one embodiment, at least some of the priority source locations associated with the merchant of CREATE A PRIORITY COMMUNICATION SOURCE LOCATION DATABASE FOR THE MERCHANT OPERATION 205 are provided by the merchant and/or a third party, such as a third party for whom the merchant is a client and/or customer.

In one embodiment, at least some of the priority source locations associated with the merchant of CREATE A PRIORITY COMMUNICATION SOURCE LOCATION DATABASE FOR THE MERCHANT OPERATION 205 are determined by process for prioritizing commercial communications based on location data 200, and/or any other party, and based on analysis of data provided by the merchant and/or a third party, such as a third party for whom the merchant is a client and/or customer.

In one embodiment, at least some of the priority source locations associated with the merchant of CREATE A PRIORITY COMMUNICATION SOURCE LOCATION DATABASE FOR THE MERCHANT OPERATION 205 are determined by process for prioritizing commercial communications based on location data 200, and/or any other party, and based on analysis of the merchant's business and/or the name of the merchant and/or the location of the merchant.

In various embodiments, at least some of the priority source locations associated with the merchant of CREATE A PRIORITY COMMUNICATION SOURCE LOCATION DATABASE FOR THE MERCHANT OPERATION 205 are determined by any means, method, process, and/or procedure and/or combination of means, methods, processes, and/or procedures, as discussed herein, and/or as known in the art at the time of filing, and/or as developed after the time of filing.

In one embodiment, once a priority communication source location database is created for, and/or associated with, the merchant of A MERCHANT IS IDENTIFIED/SIGNED UP OPERATION 203 that includes data indicating priority source locations associated with the merchant that, when associated with a communication from the source party, indicate that the communication from the source party is a priority communication for the merchant at CREATE A PRIORITY COMMUNICATION SOURCE LOCATION DATABASE FOR THE MERCHANT OPERATION 205 process flow proceeds to RECEIVE A COMMUNICATION FROM A SOURCE PARTY USING A SOURCE PARTY COMMUNICATION SYSTEM OPERATION 207.

In one embodiment, at RECEIVE A COMMUNICATION FROM A SOURCE PARTY USING A SOURCE PARTY COMMUNICATION SYSTEM OPERATION 207 a communication from a source party is received from a source party using a source party communication system.

In one embodiment, at RECEIVE A COMMUNICATION FROM A SOURCE PARTY USING A SOURCE PARTY COMMUNICATION SYSTEM OPERATION 207 a communication, such as communication 205A, communication 205B, and/or communication 205C of FIG. 1, from a source party is received from a source party using a source party communication system, such as source party communication systems 100A, 100B, 100C of FIG. 1, and one or more communications links, such as communications links 130A and 130B of FIG. 1, and/or a network, such as the Internet, or network 140 of FIG. 1.

Returning to FIG. 1, in various embodiments, at RECEIVE A COMMUNICATION FROM A SOURCE PARTY USING A SOURCE PARTY COMMUNICATION SYSTEM OPERATION 207, the source party communication system can be, but is not limited to: a mobile phone; a land-line phone, a VOIP phone, a smart phone; an SMS capable system; any mobile computing system; any other computing system and/or computing system implemented process or application; and/or any device that generates, provides, and/or includes, location and/or position data associated with the source party communication system and that indicates a current location or position of the source party communication system and/or the source party.

In one embodiment, once a communication from a source party is received from a source party using a source party communication system at RECEIVE A COMMUNICATION FROM A SOURCE PARTY USING A SOURCE PARTY COMMUNICATION SYSTEM OPERATION 207 process flow proceeds to DETERMINE THE SOURCE LOCATION ASSOCIATED WITH THE COMMUNICATION SOURCE PARTY FROM THE SOURCE PARTY COMMUNICATION SYSTEM OPERATION 209.

In one embodiment, at DETERMINE THE SOURCE LOCATION ASSOCIATED WITH THE COMMUNICATION SOURCE PARTY FROM THE SOURCE PARTY COMMUNICATION SYSTEM OPERATION 209 the source location of the source party communication system, and/or the source party, of RECEIVE A COMMUNICATION FROM A SOURCE PARTY USING A SOURCE PARTY COMMUNICATION SYSTEM OPERATION 207 is determined from location data, such as GPS, IP addresses, text fields, phone numbers, caller ID, or other location and/or positional data, provided by, and/or received from, the source party communication system, and/or the source party.

In one embodiment, at DETERMINE THE SOURCE LOCATION ASSOCIATED WITH THE COMMUNICATION SOURCE PARTY FROM THE SOURCE PARTY COMMUNICATION SYSTEM OPERATION 209 the source location of the source party communication system, and/or the source party, of RECEIVE A COMMUNICATION FROM A SOURCE PARTY USING A SOURCE PARTY COMMUNICATION SYSTEM OPERATION 207 is determined from location data, such as location identification data 105A, location identification data 105B, and/or location identification data 105C, of FIG. 1, provided by, and/or received from, the source party communication system, such as source party communication systems 100A, 100B and/or 100C of FIG. 1, and/or the source party(s).

Some currently available location and/or positional data, i.e., location identification data, include, but is not limited to: data entered in a data field of computer generated forms; GPS data; IP addresses; caller ID data; a phone number; an area code; data provided through a computing system, and/or a process and/or application implemented on a computing system; and/or any other means, method, process, and/or procedure and/or combination of means, methods, processes, and/or procedures, for providing location and/or positional data as discussed herein, and/or as known in the art at the time of filing, and/or as developed after the time of filing.

Returning to FIG. 2, in one embodiment, once the source location of the source party communication system, and/or the source party, of RECEIVE A COMMUNICATION FROM A SOURCE PARTY USING A SOURCE PARTY COMMUNICATION SYSTEM OPERATION 207 is determined from location data, such as GPS, IP addresses, text fields, phone numbers, caller ID, or other location and/or positional data, provided by, and/or received from, the source party communication system, and/or the source party at DETERMINE THE SOURCE LOCATION ASSOCIATED WITH THE COMMUNICATION SOURCE PARTY FROM THE SOURCE PARTY COMMUNICATION SYSTEM OPERATION 209 process flow proceeds to USE DATA REPRESENTING THE DETERMINED SOURCE LOCATION ASSOCIATED WITH THE COMMUNICATION SOURCE PARTY TO SEARCH THE PRIORITY COMMUNICATION SOURCE LOCATION DATABASE FOR THE MERCHANT TO DETERMINE IF THE SOURCE LOCATION ASSOCIATED WITH THE COMMUNICATION SOURCE PARTY MATCHES A PRIORITY SOURCE LOCATION OPERATION 211.

In one embodiment, at USE DATA REPRESENTING THE DETERMINED SOURCE LOCATION ASSOCIATED WITH THE COMMUNICATION SOURCE PARTY TO SEARCH THE PRIORITY COMMUNICATION SOURCE LOCATION DATABASE FOR THE MERCHANT TO DETERMINE IF THE SOURCE LOCATION ASSOCIATED WITH THE COMMUNICATION SOURCE PARTY MATCHES A PRIORITY SOURCE LOCATION OPERATION 211 data representing the determined source location of the source party communication system, and/or the source party, of DETERMINE THE SOURCE LOCATION ASSOCIATED WITH THE COMMUNICATION SOURCE PARTY FROM THE SOURCE PARTY COMMUNICATION SYSTEM OPERATION 209 is used to search the priority communication source location database created for, and/or associated with, the merchant of CREATE A PRIORITY COMMUNICATION SOURCE LOCATION DATABASE FOR THE MERCHANT OPERATION 205.

In one embodiment, at USE DATA REPRESENTING THE DETERMINED SOURCE LOCATION ASSOCIATED WITH THE COMMUNICATION SOURCE PARTY TO SEARCH THE PRIORITY COMMUNICATION SOURCE LOCATION DATABASE FOR THE MERCHANT TO DETERMINE IF THE SOURCE LOCATION ASSOCIATED WITH THE COMMUNICATION SOURCE PARTY MATCHES A PRIORITY SOURCE LOCATION OPERATION 211 data representing the determined source location of the source party communication system, and/or the source party, such as location identification data 105A, 105B, and 105C of FIG. 1, is used to search the priority communication source location database, such as database 170 and/or a portion of communication processing computing system 120 and/or priority location data 127, created for, and/or associated with, the merchant under the direction of one or more processors, such as processor 121 of FIG. 1, associated with the one or more computing systems, such as communications processing computing system 120 of FIG. 1.

Returning to FIG. 2, in one embodiment, once data representing the determined source location of the source party communication system, and/or the source party, of DETERMINE THE SOURCE LOCATION ASSOCIATED WITH THE COMMUNICATION SOURCE PARTY FROM THE SOURCE PARTY COMMUNICATION SYSTEM OPERATION 209 is used to search the priority communication source location database created for, and/or associated with, the merchant of CREATE A PRIORITY COMMUNICATION SOURCE LOCATION DATABASE FOR THE MERCHANT OPERATION 205 at USE DATA REPRESENTING THE DETERMINED SOURCE LOCATION ASSOCIATED WITH THE COMMUNICATION SOURCE PARTY TO SEARCH THE PRIORITY COMMUNICATION SOURCE LOCATION DATABASE FOR THE MERCHANT TO DETERMINE IF THE SOURCE LOCATION ASSOCIATED WITH THE COMMUNICATION SOURCE PARTY MATCHES A PRIORITY SOURCE LOCATION OPERATION 211 process flow proceeds to DETERMINE THAT THE SOURCE LOCATION ASSOCIATED WITH THE COMMUNICATION SOURCE PARTY MATCHES A PRIORITY SOURCE LOCATION IN THE PRIORITY COMMUNICATION SOURCE LOCATION DATABASE FOR THE MERCHANT OPERATION 213.

In one embodiment, at DETERMINE THAT THE SOURCE LOCATION ASSOCIATED WITH THE COMMUNICATION SOURCE PARTY MATCHES A PRIORITY SOURCE LOCATION IN THE PRIORITY COMMUNICATION SOURCE LOCATION DATABASE FOR THE MERCHANT OPERATION 213 by virtue of the analysis and/or search of USE DATA REPRESENTING THE DETERMINED SOURCE LOCATION ASSOCIATED WITH THE COMMUNICATION SOURCE PARTY TO SEARCH THE PRIORITY COMMUNICATION SOURCE LOCATION DATABASE FOR THE MERCHANT TO DETERMINE IF THE SOURCE LOCATION ASSOCIATED WITH THE COMMUNICATION SOURCE PARTY MATCHES A PRIORITY SOURCE LOCATION OPERATION 211, it is determined that the data representing the source location of the source party communication system, and/or the source party, of DETERMINE THE SOURCE LOCATION ASSOCIATED WITH THE COMMUNICATION SOURCE PARTY FROM THE SOURCE PARTY COMMUNICATION SYSTEM OPERATION 209 matches some of the data indicating priority source locations in the priority communication source location database created for, and/or associated with, the merchant of CREATE A PRIORITY COMMUNICATION SOURCE LOCATION DATABASE FOR THE MERCHANT OPERATION 205.

In one embodiment, at DETERMINE THAT THE SOURCE LOCATION ASSOCIATED WITH THE COMMUNICATION SOURCE PARTY MATCHES A PRIORITY SOURCE LOCATION IN THE PRIORITY COMMUNICATION SOURCE LOCATION DATABASE FOR THE MERCHANT OPERATION 213 it is determined that the data representing the source location of the source party communication system, and/or the source party, such as location identification data 105A, 105B, and 105O of FIG. 1, matches some of the priority location, such as priority location data 127 of FIG. 1, in the priority communication source location database, such as database 170 and/or a portion of communication processing computing system 120 and/or priority location data 127 of FIG. 1, created for, and/or associated with, the merchant under the direction of one or more processors, such as processor 121 of FIG. 1, associated with the one or more computing systems, such as communications processing computing system 120 of FIG. 1.

Returning to FIG. 2, in one embodiment, at DETERMINE THAT THE SOURCE LOCATION ASSOCIATED WITH THE COMMUNICATION SOURCE PARTY MATCHES A PRIORITY SOURCE LOCATION IN THE PRIORITY COMMUNICATION SOURCE LOCATION DATABASE FOR THE MERCHANT OPERATION 213, the data representing the determined source location of the source party communication system, and/or the source party, is considered to match the data indicating priority source locations in the priority communication source location database created for, and/or associated with, the merchant, if the source location of the source party communication system is determined to be within a defined tolerance, such as a defined radius, or other distance, of one or more of the priority source locations.

In various embodiments, the defined tolerance is determined by process for prioritizing commercial communications 200, and/or a provider of process for prioritizing commercial communications 200, and/or the merchant, and/or a third party to whom the merchant is a client and/or customer, and/or any other party.

In one embodiment, once it is determined that the data representing the source location of the source party communication system, and/or the source party, matches, or matches within a defined tolerance, some of the data indicating priority source locations in the priority communication source location database created for, and/or associated with, the merchant at DETERMINE THAT THE SOURCE LOCATION ASSOCIATED WITH THE COMMUNICATION SOURCE PARTY MATCHES A PRIORITY SOURCE LOCATION IN THE PRIORITY COMMUNICATION SOURCE LOCATION DATABASE FOR THE MERCHANT OPERATION 213 process flow proceeds to TRANSFORM THE STATUS OF THE COMMUNICATION FROM THE SOURCE PARTY TO "PRIORITY COMMUNICATION" AND PRIORITIZE THE PROCESSING OF THE COMMUNICATION FROM THE SOURCE PARTY FOR AND/OR BY THE MERCHANT OPERATION 215.

In one embodiment, at TRANSFORM THE STATUS OF THE COMMUNICATION FROM THE SOURCE PARTY TO "PRIORITY COMMUNICATION" AND PRIORITIZE THE PROCESSING OF THE COMMUNICATION FROM THE SOURCE PARTY FOR AND/OR BY THE MERCHANT OPERATION 215 the status of the communication from the source party determined at DETERMINE THAT THE SOURCE LOCATION ASSOCIATED WITH THE COMMUNICATION SOURCE PARTY MATCHES A PRIORITY SOURCE LOCATION IN THE PRIORITY COMMUNICATION SOURCE LOCATION DATABASE FOR THE MERCHANT OPERATION 213 to be from a source location that matches, or matches within a defined tolerance, some of the data indicating priority source locations in the priority communication source location database created for, and/or associated with, the merchant is transformed to a status of priority communication and the communication from the source party is processed by, and/or for, the merchant on a priority basis.

In one embodiment, at TRANSFORM THE STATUS OF THE COMMUNICATION FROM THE SOURCE PARTY TO "PRIORITY COMMUNICATION" AND PRIORITIZE THE PROCESSING OF THE COMMUNICATION FROM THE SOURCE PARTY FOR AND/OR BY THE MERCHANT OPERATION 215 the status of the communication from the source party determined to be from a source location that matches, or matches within a defined tolerance, some of the data indicating priority source locations in the priority communication source location database created for, and/or associated with, the merchant is transformed to a status of priority communication and the identified priority communication from the source party is processed by, and/or for, the merchant on a priority basis using more processors, such as processor 121 of FIG. 1, associated with the one or more computing systems, such as communications processing computing system 120 of FIG. 1

Returning to FIG. 2, in one embodiment, at TRANSFORM THE STATUS OF THE COMMUNICATION FROM THE SOURCE PARTY TO "PRIORITY COMMUNICATION" AND PRIORITIZE THE PROCESSING OF THE COMMUNICATION FROM THE SOURCE PARTY FOR AND/OR BY THE MERCHANT OPERATION 215 the status of the communication from the source party determined to be from a source location that matches, or matches within a defined tolerance, some of the data indicating priority source locations in the priority communication source location database created for, and/or associated with, the merchant is transformed to a status of priority communication and the identified priority communication from the source party is moved to a priority processing queue, such as priority processing queue 125A of FIG. 1, to be processed by, and/or for, the merchant on a priority basis.

Returning to FIG. 2, in one embodiment, at TRANSFORM THE STATUS OF THE COMMUNICATION FROM THE SOURCE PARTY TO "PRIORITY COMMUNICATION" AND PRIORITIZE THE PROCESSING OF THE COMMUNICATION FROM THE SOURCE PARTY FOR AND/OR BY THE MERCHANT OPERATION 215 the identified priority communication from the source party is processed on a priority basis by the merchant.

In one embodiment, at TRANSFORM THE STATUS OF THE COMMUNICATION FROM THE SOURCE PARTY TO "PRIORITY COMMUNICATION" AND PRIORITIZE THE PROCESSING OF THE COMMUNICATION FROM THE SOURCE PARTY FOR AND/OR BY THE MERCHANT OPERATION 215 the identified priority communication from the source party is processed on a priority basis by a third party on behalf of the merchant.

As one illustrative example of the use of one embodiment of process for prioritizing commercial communications based on location data 200, a user who provides services and needs to process communications from some of the user's clients, i.e., "priority clients", or customers of the user's priority clients, on a priority or expedited basis, would use process for prioritizing commercial communications based on location data 200 to identify communications originating from, or from the vicinity of, stores associated with the priority client and/or selling the priority client's products and/or services. The user would then prioritize processing these communications accordingly.

As an even more specific example, assume a user who is a credit approval service provider is contractually obligated to process credit applications from potential customers of their largest, "priority client" in a defined timeframe, such as within 15 minutes.

Using process for prioritizing commercial communications based on location data 200, the user would identify the priority client at A MERCHANT IS IDENTIFIED/SIGNED UP OPERATION 203 as the merchant of interest. A priority communication source location database would be created for, and/or associated with, the priority client of the user credit approval service provider and/or any sellers of the products and/or services associated with the priority client, that includes data indicating priority source locations associated with the priority client and/or any sellers of the products and/or services associated with the priority client at CREATE A PRIORITY COMMUNICATION SOURCE LOCATION DATABASE FOR THE MERCHANT OPERATION 205.

In this specific example, when a credit application, and/or credit application communication, is received by the user credit approval service provider RECEIVE A COMMUNICATION FROM A SOURCE PARTY USING A SOURCE PARTY COMMUNICATION SYSTEM OPERATION 207, the location of the customer/submitter of the credit application, and/or credit application communication, i.e., the source location of the source party and/or the source party communication system, is determined at DETERMINE THE SOURCE LOCATION ASSOCIATED WITH THE COMMUNICATION SOURCE PARTY FROM THE SOURCE PARTY COMMUNICATION SYSTEM OPERATION 209 by obtaining location information from any of: an electronically submitted credit application form data entry field specifying the location, and/or credit application form communication specifying the location; a mobile computing system or phone used to submit, or make, the credit application, and/or credit application communication; and/or a store operated computing system or phone used to submit, or make, the credit application, and/or credit application communication.

In this specific illustrative example, data indicating the source location of the source party and/or the source party communication system, i.e., the source location of the credit application, and/or credit application communication, is compared with the priority source location data in the priority communication source location database created for, and/or associated with, the priority client of the user credit approval service provider at USE DATA REPRESENTING THE DETERMINED SOURCE LOCATION ASSOCIATED WITH THE COMMUNICATION SOURCE PARTY TO SEARCH THE PRIORITY COMMUNICATION SOURCE LOCATION DATABASE FOR THE MERCHANT TO DETERMINE IF THE SOURCE LOCATION ASSOCIATED WITH THE COMMUNICATION SOURCE PARTY MATCHES A PRIORITY SOURCE LOCATION OPERATION 211.

In this specific illustrative example, if it is found that the source location of the credit application, and/or credit application communication, is, or is in the vicinity of, one of the priority source locations for, and/or associated with, the priority client of the credit approval service provider, i.e., the priority client location, or the location of stores associated with the priority client and/or selling the priority client's products and/or services, at DETERMINE THAT THE SOURCE LOCATION ASSOCIATED WITH THE COMMUNICATION SOURCE PARTY MATCHES A PRIORITY SOURCE LOCATION IN THE PRIORITY COMMUNICATION SOURCE LOCATION DATABASE FOR THE MERCHANT OPERATION 213, then the status of the credit application, and/or credit application communication, would be transformed to a status of priority communication and the credit application, and/or credit application communication, would be moved into a priority queue and processed on a priority basis by the user credit approval service at TRANSFORM THE STATUS OF THE COMMUNICATION FROM THE SOURCE PARTY TO "PRIORITY COMMUNICATION" AND PRIORITIZE THE PROCESSING OF THE COMMUNICATION FROM THE SOURCE PARTY FOR AND/OR BY THE MERCHANT OPERATION 215.

As another illustrative example of the use of one embodiment of process for prioritizing commercial communications based on location data 200, a user who provides products and/or services and wants to process communications from customers, or potential customers, who meet one or more priority criteria would use process for prioritizing commercial communications based on location data 200 to identify communications from these priority customers based on their location data.

As an even more specific example, assume a user is a car dealer and this car dealer desires to process communications, such as phone calls or credit preapproval applications, from competitors locations, or nearby locations, on a priority basis.

Using process for prioritizing commercial communications based on location data 200, the car dealer would sign up for process for prioritizing commercial communications based on location data 200 as the merchant of interest at A MERCHANT IS IDENTIFIED/SIGNED UP OPERATION 203. A priority communication source location database would be created for, and/or associated with, the car dealer and would include data indicating priority source locations associated with the car dealer's competitors and/or other locations near the car dealer or the competitors of the car dealer at CREATE A PRIORITY COMMUNICATION SOURCE LOCATION DATABASE FOR THE MERCHANT OPERATION 205.

In this specific example, when a communication, such as a phone call from a mobile phone or computing system, is received by the car dealer's communications system at RECEIVE A COMMUNICATION FROM A SOURCE PARTY USING A SOURCE PARTY COMMUNICATION SYSTEM OPERATION 207, the location of the caller's mobile phone or computing system, and/or the caller, i.e., the source location of the source party and/or the source party communication system, could be determined by obtaining location information from the mobile phone or computing system used to initiate the communication, i.e., to make the call at DETERMINE THE SOURCE LOCATION ASSOCIATED WITH THE COMMUNICATION SOURCE PARTY FROM THE SOURCE PARTY COMMUNICATION SYSTEM OPERATION 209. In this example, assume the mobile phone or computing system has a GPS, caller ID, or other caller location function.

In this specific illustrative example, data indicating the source location of the source party and/or the source party communication system, i.e., the location of the caller and/or the mobile phone or computing system, is compared with the priority source location data in the priority communication source location database created for, and/or associated with, the car dealer at USE DATA REPRESENTING THE DETERMINED SOURCE LOCATION ASSOCIATED WITH THE COMMUNICATION SOURCE PARTY TO SEARCH THE PRIORITY COMMUNICATION SOURCE LOCATION DATABASE FOR THE MERCHANT TO DETERMINE IF THE SOURCE LOCATION ASSOCIATED WITH THE COMMUNICATION SOURCE PARTY MATCHES A PRIORITY SOURCE LOCATION OPERATION 211.

In this specific illustrative example, if it is found that the source location of mobile phone or computing system, is, or is in the vicinity of, the priority source locations for, and/or associated with, the competitors of the car dealer, and/or the specified nearby locations at DETERMINE THAT THE SOURCE LOCATION ASSOCIATED WITH THE COMMUNICATION SOURCE PARTY MATCHES A PRIORITY SOURCE LOCATION IN THE PRIORITY COMMUNICATION SOURCE LOCATION DATABASE FOR THE MERCHANT OPERATION 213, then the status of the phone call, or other communication, would be transformed to a status of priority communication and the phone call, or other communication, would be processed on a priority basis by the car dealer, e.g., the phone call would be moved into a priority queue and taken by a salesperson as soon as possible at TRANSFORM THE STATUS OF THE COMMUNICATION FROM THE SOURCE PARTY TO "PRIORITY COMMUNICATION" AND PRIORITIZE THE PROCESSING OF THE COMMUNICATION FROM THE SOURCE PARTY FOR AND/OR BY THE MERCHANT OPERATION 215.

As another illustrative example of the use of one embodiment of process for prioritizing commercial communications based on location data 200, a user who provides products and/or services and wants to process communications from customers, or potential customers, who meet one or more proximity priority criteria would use process for prioritizing commercial communications based on location data 200 to identify communications from these priority customers based on their location data.

As an even more specific example, assume a user is a dry cleaner who gets over 90% of his business from local residents and the dry cleaner desires to process communications, such as phone calls and/or e-mails, from locations within defined area surrounding the dry cleaner's business on a priority basis.

Using process for prioritizing commercial communications based on location data 200, the dry cleaner would sign up for process for prioritizing commercial communications based on location data 200 as the merchant of interest at A MERCHANT IS IDENTIFIED/SIGNED UP OPERATION 203.

A priority communication source location database would be created for, and/or associated with, the dry cleaner and would include data indicating priority source locations and other data, such as phone number sequences, associated with the dry cleaner's location and the area of interest at CREATE A PRIORITY COMMUNICATION SOURCE LOCATION DATABASE FOR THE MERCHANT OPERATION 205.

In this specific example, when a communication, such as a phone call, is received by the dry cleaner's communications system at RECEIVE A COMMUNICATION FROM A SOURCE PARTY USING A SOURCE PARTY COMMUNICATION SYSTEM OPERATION 207, the location of the caller's phone or computing system, and/or the caller, i.e., the source location of the source party and/or the source party communication system, could be determined by obtaining location information from the phone or computing system used to initiate the communication, i.e., to make the call at DETERMINE THE SOURCE LOCATION ASSOCIATED WITH THE COMMUNICATION SOURCE PARTY FROM THE SOURCE PARTY COMMUNICATION SYSTEM OPERATION 209. In this example, assume the phone or computing system has a GPS, caller ID, or some other caller location function.

In this specific illustrative example, data indicating the source location of the source party and/or the source party communication system, i.e., the location of the caller and/or the phone or computing system, is compared with the priority source location data in the priority communication source location database created for, and/or associated with, the dry cleaner at USE DATA REPRESENTING THE DETERMINED SOURCE LOCATION ASSOCIATED WITH THE COMMUNICATION SOURCE PARTY TO SEARCH THE PRIORITY COMMUNICATION SOURCE LOCATION DATABASE FOR THE MERCHANT TO DETERMINE IF THE SOURCE LOCATION ASSOCIATED WITH THE COMMUNICATION SOURCE PARTY MATCHES A PRIORITY SOURCE LOCATION OPERATION 211.

In this specific illustrative example, if it is found that the source location of the phone or computing system, is, or is in the vicinity of, the priority source locations for, and/or associated with, the dry cleaner, and/or the area specified, at DETERMINE THAT THE SOURCE LOCATION ASSOCIATED WITH THE COMMUNICATION SOURCE PARTY MATCHES A PRIORITY SOURCE LOCATION IN THE PRIORITY COMMUNICATION SOURCE LOCATION DATABASE FOR THE MERCHANT OPERATION 213 then the status of the phone call, or other communication, would be transformed to a status of priority communication and the phone call, or other communication, would be processed on a priority basis by the dry cleaner, e.g., the phone call would be moved into a priority queue and taken as soon as possible at TRANSFORM THE STATUS OF THE COMMUNICATION FROM THE SOURCE PARTY TO "PRIORITY COMMUNICATION" AND PRIORITIZE THE PROCESSING OF THE COMMUNICATION FROM THE SOURCE PARTY FOR AND/OR BY THE MERCHANT OPERATION 215.

Those of skill in the art will readily recognize that the three specific examples discussed above are presented for illustrative purposes only and that numerous other examples, embodiments, combinations, uses, and implementations are possible. Consequently, the three specific examples discussed above do not, in any way, limit the scope of the claims presented below.

In one embodiment, once the status of the communication from the source party determined to be from a source location that matches, or matches within a defined tolerance, some of the data indicating priority source locations in the priority communication source location database created for, and/or associated with, the merchant is transformed to a status of priority communication and the communication from the source party is processed by, and/or for, the merchant on a priority basis at TRANSFORM THE STATUS OF THE COMMUNICATION FROM THE SOURCE PARTY TO "PRIORITY COMMUNICATION" AND PRIORITIZE THE PROCESSING OF THE COMMUNICATION FROM THE SOURCE PARTY FOR AND/OR BY THE MERCHANT OPERATION 215 process flow proceeds to EXIT OPERATION 230.

In one embodiment at EXIT OPERATION 230 process for prioritizing commercial communications based on location data 200 is exited to await new data.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

Using process for prioritizing commercial communications based on location data 200, a merchant is provided the ability to prioritize the processing of communications based on the locations of the source party communication systems used to initiate the communications and using location data provided by the source party communication systems themselves. Consequently using process for prioritizing commercial communications based on location data 200, a merchant can identify priority communications, and prioritize the processing of the identified priority communications, more readily; thereby avoiding the need to choose between the two undesirable options of committing the resources to allow each communication to be treated as a priority communication or risking the loss of priority customers and/or clients that is necessitated using currently available methods and systems.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "receiving", "determining", "obtaining", "using", "transforming", "designating", "identifying", "implementing", "detecting", "correlating", "monitoring", "matching", "updating", "associating", "analyzing", "defining", "storing", "saving", "displaying", "categorizing", "providing", "processing", "accessing", "selecting", "creating", "using", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for prioritizing commercial communications based on location data comprising:
   identifying a merchant;
   determining, through an analysis of business of the merchant, one or more priority source locations associated with the merchant;
   creating a priority communication source location database associated with the merchant, the priority communication source location database including priority source locations associated with the merchant that were determined through the analysis of the merchant's business and further including data indicating priority source locations associated with the merchant that, when associated with a communication from a source party, indicate that the communication from the source party is a priority communication for the merchant;

storing, within the priority communication source location database, data indicating the determined one or more priority source locations associated with the merchant;

receiving a source party communication from a source party communication system;

using one or more processors associated with one or more computing systems to obtain data indicating a source location associated with the source party communication and/or the source party communication system;

using one or more processors associated with one or more computing systems to analyze the previously stored priority communication source location database data indicating the determined one or more priority source locations associated with the merchant and the data indicating the source location associated with the source party communication and/or the source party communication system to determine if the data indicating the source location associated with the source party communication and/or the source party communication system matches, or matches within a defined tolerance, the data indicating priority source locations associated with the merchant;

using one or more processors associated with one or more computing systems to determine that the data indicating the source location associated with the source party communication and/or the source party communication system matches, or matches within a defined tolerance, the data indicating one or more priority source locations associated with the merchant that were previously determined through the analysis of the merchant's business;

using one or more processors associated with one or more computing systems to transform a status of the source party communication to a status of priority source party communication; and processing the identified priority source party communication on a priority basis.

2. The computing system implemented process for prioritizing commercial communications based on location data of claim 1, wherein;
the merchant is identified by a party other than the merchant.

3. The computing system implemented process for prioritizing commercial communications based on location data of claim 1, wherein;
the merchant is identified by a party other than the merchant, the merchant being a client of the other party.

4. The computing system implemented process for prioritizing commercial communications based on location data of claim 1, wherein;
at least part of the data indicating priority source locations associated with the merchant that, when associated with a communication from a source party, indicate that the communication from the source party is a priority communication for the merchant is selected from the group of data consisting of:
a location, and/or locations, of the merchant's store or stores;
a location, and/or locations, that include the merchant's store or stores;
a location, and/or locations, of the merchant's competitor's store or stores;
a location, and/or locations, that include the merchant's competitor's store or stores;
a location, and/or locations, of related merchants selling products and/or services related to the merchant's business; and
a location, and/or locations, that include related merchants selling products and/or services related to the merchant's business.

5. The computing system implemented process for prioritizing commercial communications based on location data of claim 1, wherein;
the source party communication system is selected from the group of source data communication systems consisting of:
a mobile phone;
a land-line phone;
a VOIP phone;
a smart phone;
an SMS capable system;
a mobile computing system;
a computing system; and
a computing system implemented process or application.

6. The computing system implemented process for prioritizing commercial communications based on location data of claim 1, wherein;
at least some of the data indicating a source location associated with the source party communication and/or the source party communication system is obtained from a data source selected from the group of data sources consisting of:
GPS data;
IP addresses;
caller ID data;
a phone number;
an area code;
data provided through a computing system and a process and/or application implemented on a computing system;
text data; and
data entered in a data field of a computer generated form.

7. The computing system implemented process for prioritizing commercial communications based on location data of claim 1, wherein;
processing the identified priority source party communication on a priority basis includes putting the identified priority source party communication in a priority processing queue.

8. A system for prioritizing commercial communications based on location data comprising:
a source party communication system;
a priority communication source location database associated with a merchant, the priority communication source location database including data indicating priority source locations associated with the merchant that, when associated with a communication from a source party, indicate that the communication from the source party is a priority communication for the merchant; and
one or more processors associated with one or more computing systems, the one or more processors associated with one or more computing systems implementing at least part of a process for prioritizing commercial communications based on location data, the process for prioritizing commercial communications based on location data including:
determining, through an analysis of business of the merchant, one or more priority source locations associated with the merchant;
storing, within the priority communication source location database, data indicating the one or more priority source locations associated with the merchant previously determined through an analysis of the business of the merchant;

receiving a source party communication from the source party communication system;

using the one or more processors associated with one or more computing systems to obtain data indicating a source location associated with the source party communication and/or the source party communication system;

using the one or more processors associated with one or more computing systems to analyze the data indicating the determined one or more priority source locations associated with the merchant in the priority communication source location database and the data indicating the source location associated with the source party communication and/or the source party communication system to determine if the data indicating the source location associated with the source party communication and/or the source party communication system matches, or matches within a defined tolerance, the data indicating one or more priority source locations associated with the merchant that were previously determined through the analysis of the merchant's business;

using the one or more processors associated with one or more computing systems to determine that the data indicating the source location associated with the source party communication and/or the source party communication system matches, or matches within a defined tolerance, the data indicating priority source locations associated with the merchant;

using the one or more processors associated with one or more computing systems to transform a status of the source party communication to a status of priority source party communication; and processing the identified priority source party communication on a priority basis.

9. The system for prioritizing commercial communications based on location data of claim 8, wherein;

at least part of the data indicating priority source locations associated with the merchant that, when associated with a communication from a source party, indicate that the communication from the source party is a priority communication for the merchant is selected from the group of data consisting of:

a location, and/or locations, of the merchant's store or stores;

a location, and/or locations, that include the merchant's store or stores;

a location, and/or locations, of the merchant's competitor's store or stores;

a location, and/or locations, that include the merchant's competitor's store or stores;

a location, and/or locations, of related merchants selling products and/or services related to the merchant's business; and a location, and/or locations, that include related merchants selling products and/or services related to the merchant's business.

10. The system for prioritizing commercial communications based on location data of claim 8, wherein;

the source party communication system is selected from the group of source data communication systems consisting of:

a mobile phone;
a land-line phone;
a VOIP phone;
a smart phone;
an SMS capable system;
a mobile computing system;
a computing system; and
a computing system implemented process or application.

11. The system for prioritizing commercial communications based on location data of claim 8, wherein;

at least some of the data indicating a source location associated with the source party communication and/or the source party communication system is obtained from a data source selected from the group of data sources consisting of:

GPS data;
IP addresses;
caller ID data;
a phone number;
an area code;
data provided through a computing system and a process and/or application implemented on a computing system;
text data; and
data entered in a data field of a computer generated form.

12. The system for prioritizing commercial communications based on location data of claim 8, wherein;

processing the identified priority source party communication on a priority basis includes putting the identified priority source party communication in a priority processing queue.

13. A method for prioritizing commercial communications based on location data comprising:

identifying a merchant;

determining, through an analysis of business of the merchant, one or more priority source locations associated with the merchant;

creating a priority communication source location database associated with the merchant, the priority communication source location database including priority source locations associated with the merchant that were determined through the analysis of the merchant's business and further including data indicating priority source locations associated with the merchant that, when associated with a communication from a source party, indicate that the communication from the source party is a priority communication for the merchant;

storing, within the priority communication source location database, data indicating the determined one or more priority source locations associated with the merchant;

receiving a source party communication from a source party communication system;

obtaining data indicating a source location associated with the source party communication and/or the source party communication system;

analyzing the previously stored priority communication source location database data indicating the determined one or more priority source locations associated with the merchant and the data indicating the source location associated with the source party communication and/or the source party communication system to determine if the data indicating the source location associated with the source party communication and/or the source party communication system matches, or matches within a defined tolerance, the data indicating priority source locations associated with the merchant;

determining that the data indicating the source location associated with the source party communication and/or the source party communication system matches, or matches within a defined tolerance, the data indicating one or more priority source locations associated with the merchant that were previously determined through the analysis of the merchant's business;

transforming a status of the source party communication to a status of priority source party communication; and processing the identified priority source party communication on a priority basis.

14. The method for prioritizing commercial communications based on location data of claim 13, wherein;

the merchant is identified by a party other than the merchant.

15. The method for prioritizing commercial communications based on location data of claim 13, wherein;

the merchant is identified by a party other than the merchant, the merchant being a client of the other party.

16. The method for prioritizing commercial communications based on location data of claim 13, wherein;

at least part of the data indicating priority source locations associated with the merchant that, when associated with a communication from a source party, indicate that the communication from the source party is a priority communication for the merchant is selected from the group of data consisting of:

a location, and/or locations, of the merchant's store or stores;

a location, and/or locations, that include the merchant's store or stores;

a location, and/or locations, of the merchant's competitor's store or stores;

a location, and/or locations, that include the merchant's competitor's store or stores;

a location, and/or locations, of related merchants selling products and/or services related to the merchant's business; and a location, and/or locations, that include related merchants selling products and/or services related to the merchant's business.

17. The method for prioritizing commercial communications based on location data of claim 13, wherein;

the source party communication system is selected from the group of source data communication systems consisting of:

a mobile phone;

a land-line phone;

a VOIP phone;

a smart phone;

an SMS capable system;

a mobile computing system;

a computing system; and a computing system implemented process or application.

18. The method for prioritizing commercial communications based on location data of claim 13, wherein;

at least some of the data indicating a source location associated with the source party communication and/or the source party communication system is obtained from a data source selected from the group of data sources consisting of:

GPS data;

IP addresses;

caller ID data;

a phone number;

an area code;

data provided through a computing system and a process and/or application implemented on a computing system;

text data; and data entered in a data field of a computer generated form.

19. The method for prioritizing commercial communications based on location data of claim 13, wherein;

processing the identified priority source party communication on a priority basis includes putting the identified priority source party communication in a priority processing queue.

* * * * *